Feb. 16, 1960  R. J. HAMILTON  2,925,135
TRACTOR UNIT COUPLING FOR TRAILERS
Filed Dec. 20, 1957  2 Sheets-Sheet 1

Raymond J. Hamilton
INVENTOR.

BY *[signatures]*
Attorneys

Feb. 16, 1960 R. J. HAMILTON 2,925,135
TRACTOR UNIT COUPLING FOR TRAILERS
Filed Dec. 20, 1957 2 Sheets-Sheet 2
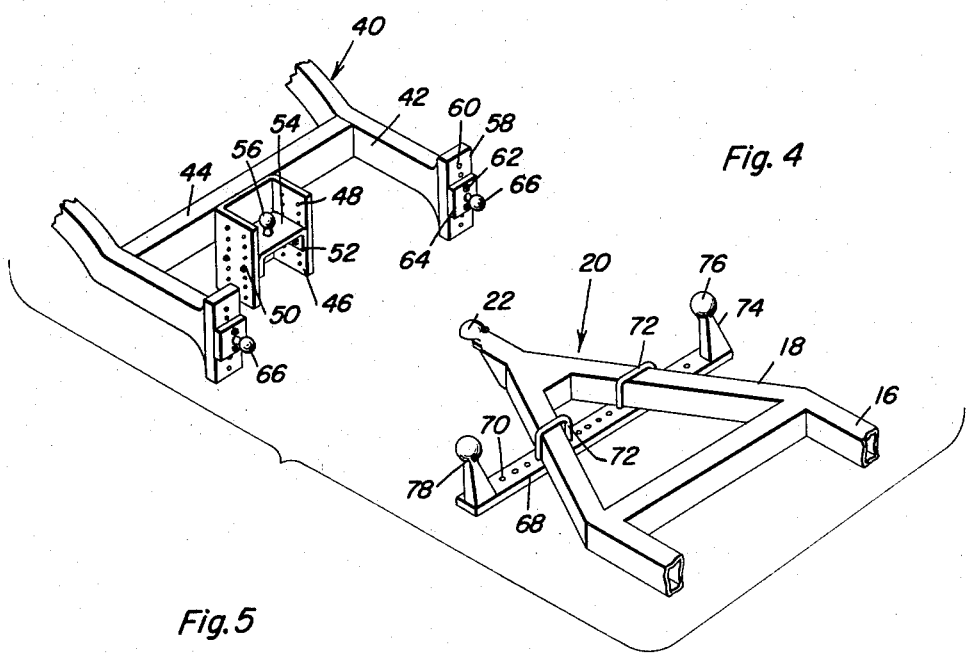
Fig. 4
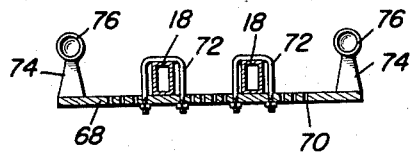
Fig. 5
Fig. 6
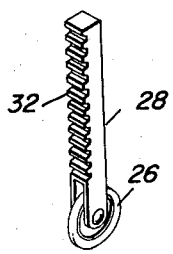
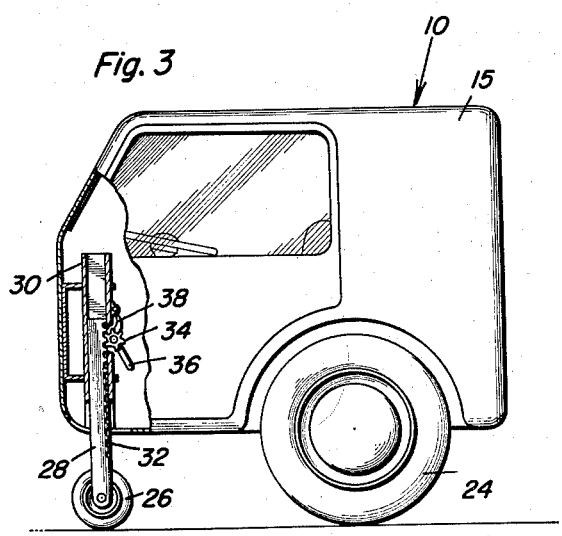
Fig. 3
Raymond J. Hamilton
INVENTOR.
BY Clarence A. O'Brien
and Harvey B. Jacobson
Attorneys

United States Patent Office 2,925,135
Patented Feb. 16, 1960

2,925,135

TRACTOR UNIT COUPLING FOR TRAILERS

Raymond J. Hamilton, Yakima, Wash.

Application December 20, 1957, Serial No. 704,152

2 Claims. (Cl. 180—12)

The present invention generally relates to a towing vehicle and more particularly to a vehicle for towing a house trailer.

In present day practice, house trailers are normally towed by an automobile, pickup truck or specially constructed trucks which are coupled with the trailer by an articulate connection. Various states have regulations limiting the overall length of a trailer and the towing vehicle and if the assembly exceeds such a length, a special permit must be obtained which requires extra difficulty and fees. The articulated connection between the trailer and the towing vehicle is a point of weakness in that it sometimes becomes disconnected and generally provides an unstable and hard to control assembly. Accordingly, it is the primary object of the present invention to provide a towing vehicle or tractor unit for house trailers which is rigidly secured to the forwardly projecting tongue of the house trailer at longitudinally and laterally spaced points thus forming a rigid unit with the towing vehicle having a single pair of driving wheels thereon which are also steerable for affording easier control of the trailer and thereby providing a more stable and safer assembly. The present device may be left attached to the house trailer at all times although it can be detached and attached to the house trailer with only a little more difficulty than the conventional hitches employed between a house trailer and the towing vehicle.

Another object of the present invention is to provide a tractor unit for towing house trailers which is constructed so that the towing vehicle will not obstruct the view normally afforded by windows in the end of the house trailer to which the towing vehicle is attached.

A further important feature of the present invention is to provide a tractor unit for towing house trailers in which the tractor unit is powered and steerable and provided with a retractible dolly wheel wherein the towing unit may become a self sustained vehicle but which normally has only two ground engaging and driving wheels which are also steerable with the towing vehicle and the trailer being one integral unit so that the entire assembly may be more easily controlled and operated in a safer manner.

Other objects of the present invention reside in its simplicity of construction, ease of attachment, safety in operation, adaptation for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a detailed sectional view taken substantially upon a plane passing along section line 3—3 of Figure 2 illustrating one structural arrangement for raising and lowering the retractible dolly wheel;

Figure 4 is a fragmental group perspective view illustrating the connection between the towing vehicle and the trailer tongue;

Figure 5 is a detailed sectional view illustrating the manner of attaching a transverse member to the tongue of the trailer; and Figure 6 is a perspective view illustrating the construction of the retractible dolly wheel.

Figure 1:
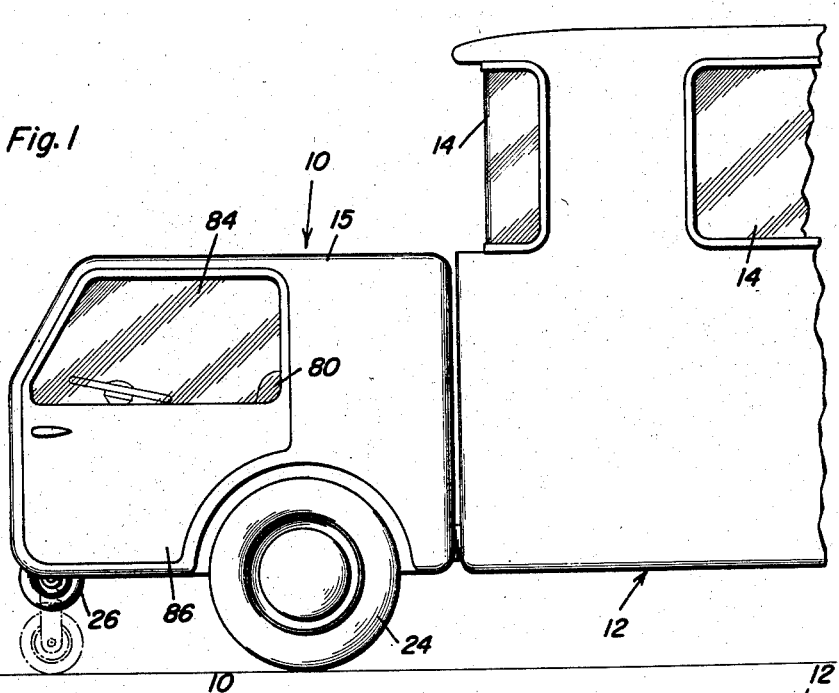
Figure 1 is a partial side elevational view of the towing unit of the present invention attached to a house trailer.
Figure 2:
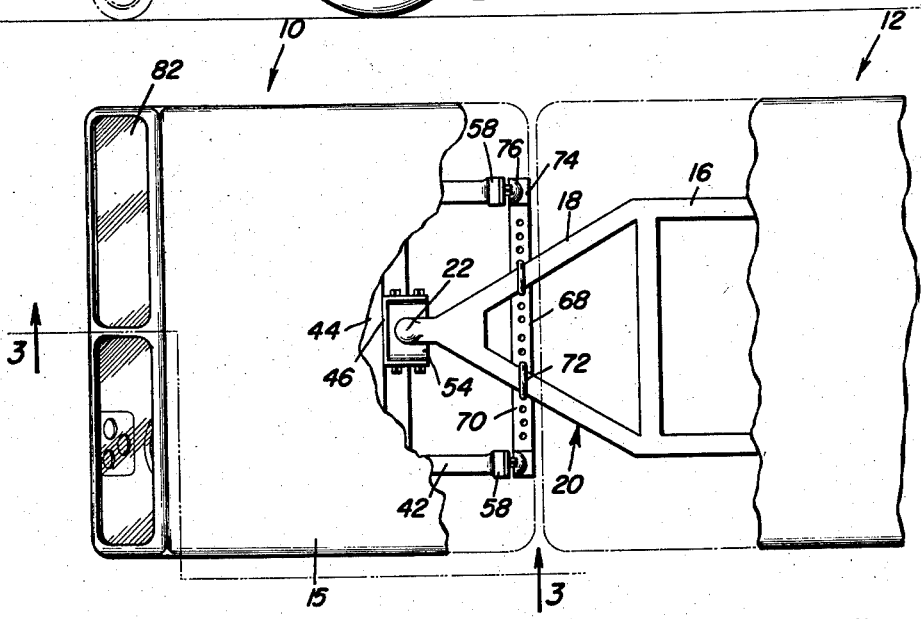
Figure 2 is a plan view of the construction of Figure 1 with portions thereof broken away showing the relationship of the house trailer and its tongue to the towing vehicle.

Referring now specifically to the drawings, the numeral 10 generally designates the tractor unit or towing vehicle of the present invention. The towing unit 10 is adapted for use in combination with or independently of a house trailer generally designated by the numeral 12 which may be of any conventional construction and which normally is provided with a window or windows 14 at the forward end thereof and along the sides thereof. The towing vehicle 10 is provided with a cab 15 which does not project above the lower edge of the forward window 14 thus eliminating any obstruction to the window 14. As shown in Figure 2, the trailer 12 includes a pair of longitudinal frame members 16 having the forward ends thereof converging as designated by the numeral 18 for defining a tongue generally designated by the numeral 20 which includes a ball socket 22 at the forward or apex end thereof. The ball socket 22 is of conventional construction as is the tongue 20 and the tongue 20 with the ball socket 22 thereon normally projects forwardly of the forward wall of the house trailer 12.

The cab 15 is constructed of any suitable material such as sheet metal or the like and is provided with a pair of powered wheels 24 which are also steerable for controlling the direction of movement of the vehicle 10. Also provided is a retractible dolly wheel 26 adjacent the forward end of the cab 15 which has an upwardly extending shank 28 thereon. The shank 28 is slidable in a tubular sleeve 30 and the shank 28 is provided with a plurality of longitudinally spaced teeth 32 for engagement with a pinion gear 34 provided with a crank handle 36 and a ratchet mechanism 38 whereby the dolly wheel 26 may be retracted and extended for forming a tricycle support arrangement with the wheels 24 or permitting the wheels 24 to form the sole support for the vehicle 10. The doly wheel 26 is only used when the towing unit 10 is detached from the trailer 12 and is not employed when the unit 10 is attached to the trailer 12. The mechanical mechanism for raising and lowering the dolly wheel 26 is illustrated to show one structure for raising and lowering this wheel and it is pointed out that a hydraulic piston and cylinder arrangement may be effectively employed for raising and lowering the dolly wheel 26.

The towing unit 10 includes a frame generally designated by the numeral 40 and including a pair of longitudinal frame rails 42 and at least a single transverse frame rail 44 disposed forwardly of the rear ends of the longitudinal frame rails 42.

Mounted rigidly centrally of the rear surface of the transverse frame rail 44 is a U-shaped bracket 46 having the rearwardly extending legs thereof provided with two rows of vertically spaced apertures 48 for receiving fastening bolts 50 which extend through the depending legs 52 of an inverted U-shaped supporting member 54 disposed between the legs of the U-shaped bracket 46 and provided with a ball member 56 on the upper surface thereof for detachable engagement with the downwardly facing ball socket 22 on the forward end of the trailer tongue 20.

The rear end of each longitudinal rail 42 terminates in a vertical plate 58 having a plurality of vertically spaced apertures 60 therein for receiving mounting bolts 62 which secure a supporting bracket 64 adjustably thereon. Each supporting bracket 64 is provided with a ball member 66 thereon which faces rearwardly.

Mounted in underlying relation to the forwardly converging members 18 which form the tongue 20 is a transverse plate member 68 having a plurality of longitudinally spaced openings 70 therein for receiving inverted U-bolts 72 which securely and adjustably mount the plate 68 to the tongue 20. Each end of the transverse plate 68 is provided with an upstanding bracket 74 having a forwardly facing ball socket 76 thereon for registry and engagement with the ball members 66 on the brackets 64. All of the ball sockets 22 and 76 are provided with a conventional lock screw or lock bolt 78 for locking the ball sockets 76 on the ball members 66. Thus, with the sockets 22 and 76 registered with the balls 56 and 66 respectively, a rigid interconnection between the towing unit frame 40 which is powered and steerable and the house trailer frame 16 and especially the house trailer tongue 20 is provided with points of attachment being laterally spaced and longitudinally spaced for rigidifying the connection.

The specific details of the towing vehicle as to the various drive mechanisms have not been illustrated since these may vary depending upon the size of the trailer to be towed and depending upon the desirability of various types of drive mechanisms. The wheels 24 may be powered with a conventional front wheel drive differential and equipped with hydraulic brakes. The power unit for the vehicle may consist of a four or six cylinder overhead valve internal combustion engine and the gear train consists of a four speed transmission connected to a transfer case which in turn is connected to the differential with a short drive shaft.

The cab 15 may contain a single bucket type seat 80, a windshield 82, two side windows 84 and one entrance door 86 on the driver's side with the other side of the cab being used for the engine. A storage space may be provided behind the driver's seat up to the roof of the cab. On the engine side it may have a hood to make the engine accessible. The gas tank may be located approximately behind and under the driver's seat. The cab may be equipped with a speedometer, ammeter, oil gauge, gas gauge, temperature gauge, bright light indicator, directional signal and indicator and also conventional or power steering and the device may also have two head lights and two parking lights used also as directional signals. Thus, the power vehicle will meet all of the requirements of various states and will be extremely safe in operation. The adjustment features in which the vertical position of the ball members may be varied will permit the towing vehicle and house trailer to be leveled or longitudinally aligned with each other thus making one unit. The towing device may also be equipped with suitable windshield wipers and an electrical receptacle will be provided for attachment to the electrical system of the house trailer so that the house trailer may be provided with brakes, lights and directional signals. Other comfort and convenience devices may be supplied as desired such as a heater for the cab, adjustable seat mechanisms, window roll-down mechanisms and the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. The combination of a trailer having a forwardly projecting draft tongue at the front end thereof, a tractor disposed forwardly of said trailer in closely spaced relation and overlying said draft tongue, said tractor including a pair of spaced side frame members and a cross frame member extending between said side frame members intermediate the ends of the latter, means securing the front end of said draft tongue to said cross frame member, a cross bar rigidly secured to said draft tongue rearwardly of the front end of the tongue, and means securing the ends of said cross bar to the rear ends of said side frame members, whereby to rigidly secure the tractor and trailer together and prevent lateral movement thereof relative to each other.

2. The device as defined in claim 1 wherein said means securing said draft tongue to said cross frame member and said means securing said cross bar to said side frame members are vertically adjustable independently of each other.

References Cited in the file of this patent

UNITED STATES PATENTS

| | | |
|---|---|---|
| 722,262 | Stone | Mar. 10, 1903 |
| 1,155,713 | Eldridge | Oct. 5, 1915 |
| 1,229,082 | Hollis | June 5, 1917 |
| 1,398,683 | Dubois | Nov. 29, 1921 |
| 1,855,642 | Masury | Apr. 26, 1932 |
| 1,945,089 | Small et al. | Jan. 30, 1934 |
| 2,315,688 | Crawford | Apr. 6, 1943 |
| 2,474,296 | Wiltsee | June 28, 1949 |
| 2,483,567 | Vars | Oct. 4, 1949 |
| 2,635,891 | Cook | Apr. 21, 1953 |
| 2,726,097 | Darrough | Dec. 6, 1955 |